United States Patent [19]

Feldt

[11] 4,246,061
[45] Jan. 20, 1981

[54] METHOD AND MACHINE FOR MANUFACTURING MULTI-TUBE FILTERS

[75] Inventor: Klas-Göran Feldt, Halmstad, Sweden

[73] Assignee: Nordifa Industritextillier AB, Halmstad, Sweden

[21] Appl. No.: 946,131

[22] Filed: Sep. 27, 1978

[30] Foreign Application Priority Data

Oct. 4, 1977 [SE] Sweden .............................. 7701108

[51] Int. Cl.³ .......................... B31F 1/34; B32B 31/00
[52] U.S. Cl. .................................... 156/474; 156/204; 156/227; 156/290; 156/553; 156/581
[58] Field of Search ............... 156/474, 443, 204, 226, 156/227, 290, 553, 581

[56] References Cited

U.S. PATENT DOCUMENTS

| | | | |
|---|---|---|---|
| 2,610,934 | 9/1952 | Steele | 156/474 |
| 2,993,525 | 7/1961 | Lincoln | 156/474 |
| 3,770,549 | 11/1973 | Carbone | 156/474 |
| 4,081,305 | 3/1978 | Patin | 156/474 |

Primary Examiner—William R. Dixon, Jr.
Attorney, Agent, or Firm—Kane, Dalsimer, Kane, Sullivan and Kurucz

[57] ABSTRACT

A method and a machine for manufacturing multi-tube filters. The filter is manufactured from a continuous material web which is folded in zigzag, one layer upon the other, the length of the respective layer corresponding to the desired length of the filter tubes. During the folding of each layer, said layer is joined to the layer below by parallel, lengthwise seams, whereby rows of contiguous filter tubes are formed and neighboring rows of filter tubes are joined together. The seams that delimit the respective tubes in a row of filter tubes are positioned in alignment with the corresponding seams in all the other rows of filter tubes and the seams that join together neighboring rows are positioned right between said tube-forming seams. The interconnected layers form, when the filter unit is extended in a direction at right angles to the layers, a filter unit comprising a plurality of tubes that are essentially square in cross-section.

13 Claims, 9 Drawing Figures

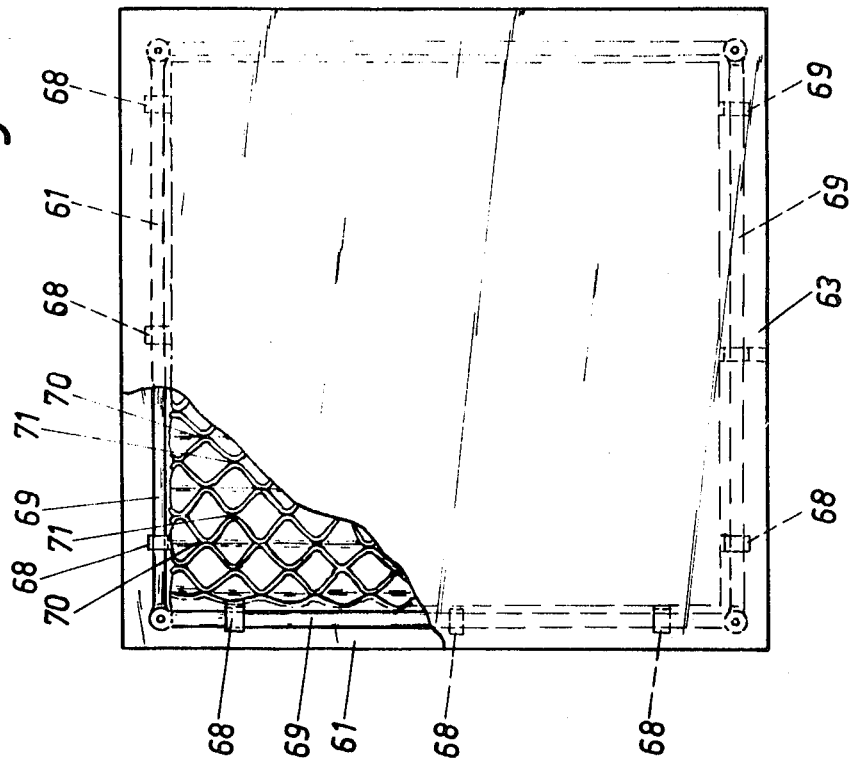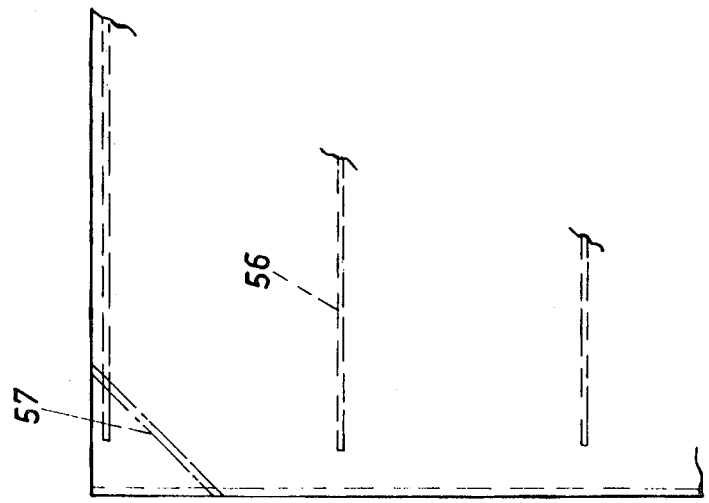

4,246,061

METHOD AND MACHINE FOR MANUFACTURING MULTI-TUBE FILTERS

BACKGROUND OF THE INVENTION

The subject invention concerns a method of manufacturing filter units comprising a plurality of filter tubes of synthetic fibres and natural fibres, and a machine designed to perform the method.

Prior-art multi-tube filters suffer from several drawbacks as regard the manufacture and the assembly as well as the function of the filters.

Hitherto, lengthwise stitched seams have been used to produce the filter, which is a very time-consuming method. It takes several hours to sew in the conventional manner a filter unit having a cross-section of 1 by 1 meter and a tube length of 1 meter. In the manufacture, only one tube row may be produced at a time, lengthwise seams in two interconnected parts of the material delimiting separate filter tubes. The rows of filter tubes are then stitched together at one end to form a filter unit.

A filter produced in this way lacks inherent stability and in order to operate as an efficient filter it must be stayed by means of special supporting, profiled rods which are inserted into each individual tube to keep it distended. Naturally, the application of special supporting profiled rods into each tube is a time-consuming task. In addition, it increases the total weight of the filter unit. On account of the resulting considerable weight of the filter unit, the latter becomes difficult to handle during assembly, and in addition the filter material which is to support both its own weight and the supporting profiles, is exposed to considerable stress. Because in operation the filter tubes move somewhat relative to the supporting profiled rods on account of the streams of gas passing through them, the rods cause a certain amount of wear on the filter material. A further disadvantage inherent in these prior-art multi-tube filters is that the support profiles, one inside each tube, occupy a considerable portion of the filtering area of the filter unit, thus considerably reducing the capacity of the filter.

Finally should be pointed out that the collapsing pressure, i.e. the maximum pressure that the filter is capable of withstanding, is comparatively low on account of the stresses exerted on the filter unit on account of its heavy weight. The same is true as concerns the cleaning pressure, i.e. the maximum allowable flow of air in the reverse flow direction through the filter to clean the latter.

The above-mentioned disadvantages are completely eliminated in the filter produced in accordance with the method of the subject invention.

SUMMARY OF THE INVENTION

The method in accordance with the invention is characterised in that the filter is manufactured from a continuous material web advanced from a supply roll by advancing a first part of the web the length of which is equal to the desired length of the tubes, folding a second part of the web at one end of said first part and feeding said second part above said first part to the opposite end thereof while simultaneously welding together, glueing together or stitching together said two parts by parallel, lengthwise seams/joints, thus forming a first row of neighbouring filter tubes, folding a third part of the web at the last-mentioned end and advancing said third part above said second part and interconnecting said second and said third parts by lengthwise welded, glued or stitched seams extending essentially halfway between said first-mentioned welded, glued or stitched seams, advancing the subsequent part of the material web above said third part and joining said part to said third part by lengthwise seams/joints positioned straight above said first-mentioned seams/joints to form a second row of filter tubes, and repeating the procedure until the desired number of connected rows of filter tubes is formed.

Because adjacent rows of filter tubes are interconnected by means of seams or joints which extend in the lengthwise direction of the tubes at the tube centres, the tubes are automatically distended when the filter unit is mounted in frames positioned at the filter unit ends. The application of special supporting profiles inside the tubes thus becomes superfluous, which results in considerable time-saving when the filter units are mounted and also means that the entire tube area may serve as a filtering area without impediment of profiled rods. In addition, the total weight of the filter unit is greatly reduced as a result of the elimination of the supporting profiles. The filter unit in accordance with the invention has a total weight of between 15 and 20 kilos for a cross-section size of 1 by 1 meter and a tube length of 1 meter, whereas prior-art filters of this type for the same size and including supporting profiled rods have a weight of about 40 kilos.

BRIEF DESCRIPTION OF THE DRAWINGS

The invention will be described in closer detail in the following with reference to one embodiment thereof illustrated in the accompanying drawings, wherein FIG. 6 shows one corner of two parts welded together to form a row of tubular filters, FIG. 8 shows a multi-tube filter in accordance with FIG. 7 in a partly broken view as seen from one end.

DETAILED DESCRIPTION OF A PREFERRED EMBODIMENT

Figure 1:
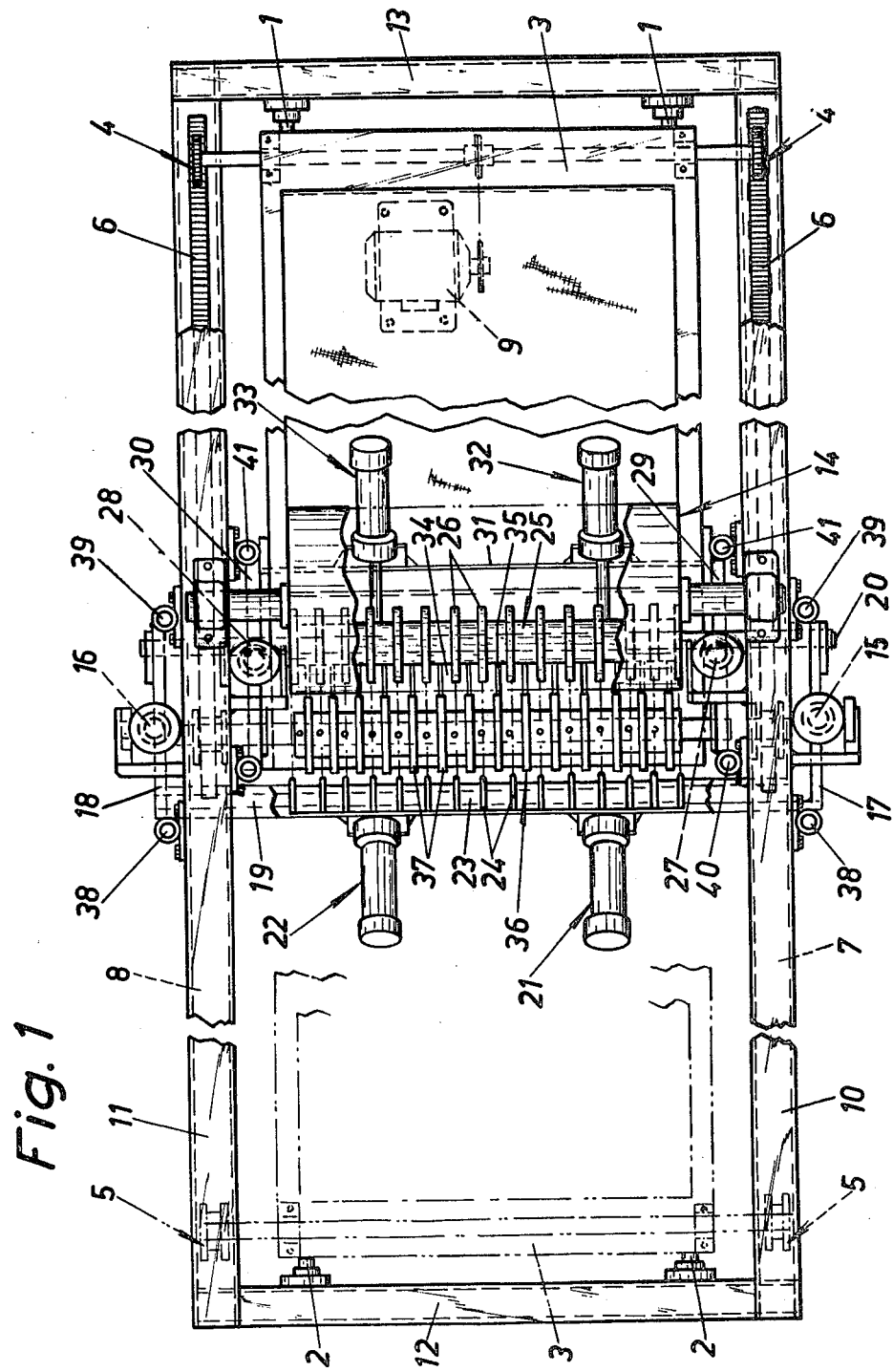
FIG. 1 is a partly broken view from above of a machine in accordance with the invention designed to produce a multi-tube filter.

The machine in accordance with FIG. 1 incorporates a table 3 which is arranged to move between a first and a second limit means 1 and 2. The table 3 is provided with two pairs of wheels, the wheels of one pair being provided with teeth for engagement with racks 6 whereas the wheels of the second pair 5 run freely on rails 7, 8. The shaft of wheel pair 4 is driven by an electric motor 9 which is positioned on the lower face of the displaceable table 3. The machine also comprises a frame including lengthwise beams 10, 11 positioned straight above the rails 7, 8 and interconnected with the transverse beams 12, 13 of the frame. On the beams 10, 11 is mounted a supply roll 14 holding filter material. On the external face of the beams 10, 11 are arranged two cooperating pistons 15 and 16 which are arranged to be raised and lowered for displacement of brackets 17, 18 mounted thereon. The latter are interconnected by a beam 19 arranged at one of the bracket ends and by a shaft 20 positioned at the opposite bracket ends. The beam 19 supports pistons 21, 22, serving to displace a rail 23 along which are provided equidistantly spaced welding members 24. The welding members 24 may be in the form of hot air nozzles or in the form of electrically heated welding jaws or collector shoes. The shaft 20 mounted in the brackets supports a presser means generally designated 25 along which are provided equidistantly spaced press rings 26. Also on the internal faces of the beams 10, 11 are provided two cooperating pistons 27, 28 which may be raised and lowered to displace brackets 29, 30 mounted thereon. These brackets are interconnected by a beam 31 positioned at one of the bracket ends and by a shaft at the opposite one of the bracket ends. Pistons 32, 33 are mounted on the beam 31 and are arranged to displace a rail 34 which is provided along its length with equidistantly spaced welding members 35. The shaft mounted in the brackets supports a presser means generally designated 36 and along which are provided equidistantly spaced press rings 37.

Figure 2:
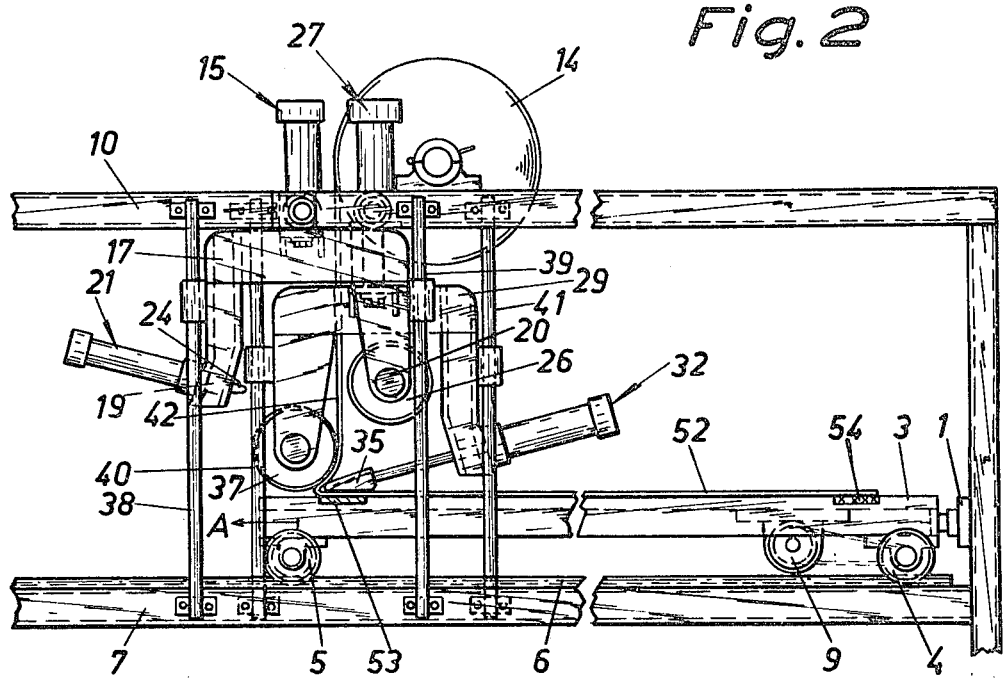
FIG. 2 shows the machine in accordance with FIG. 1 in a partly broken lateral view.

As appears from FIG. 2, the movements of respectively brackets 17, 18 and brackets 29, 30 are controlled by associated vertical controlling rods 38, 39, and 40, 41. During manufacture of the filter a continuous material web 42 runs from the supply roll 14 so as to extend between each pair of brackets 17, 18 and 29, 30, respectively, and between each one of the presser means 26 and 37 and the rails 23 and 34 associated therewith.

Figure 4:
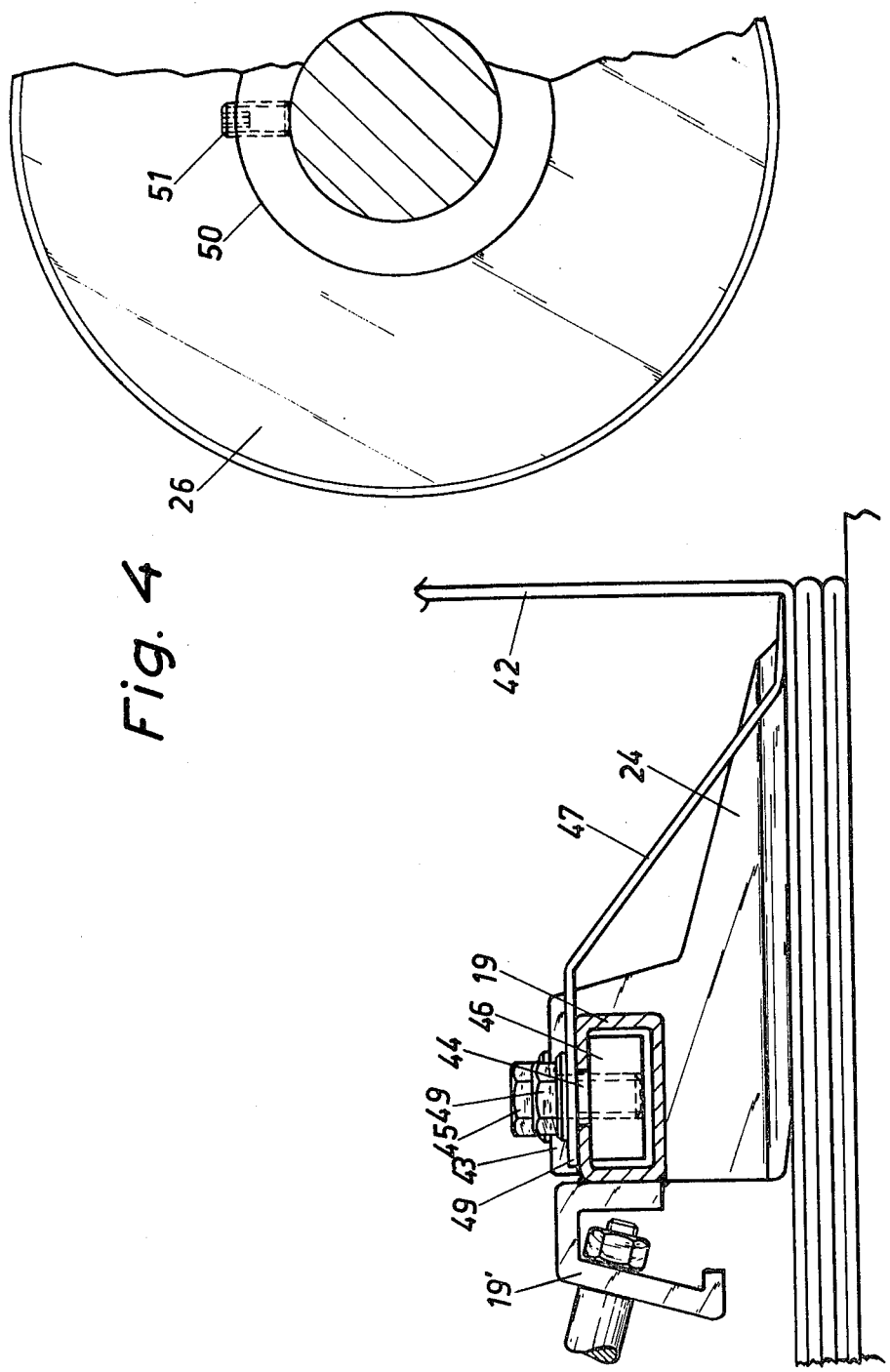
FIG. 4 illustrates on an enlarged scale a section through certain details of the machine in order to illustrate the manner of cooperation between a movable table incorporated in the device and a pressing element designed to advance a material web, and also the manner of cooperation between the pressing element and welding members designed to weld together the material web.
Figure 5:
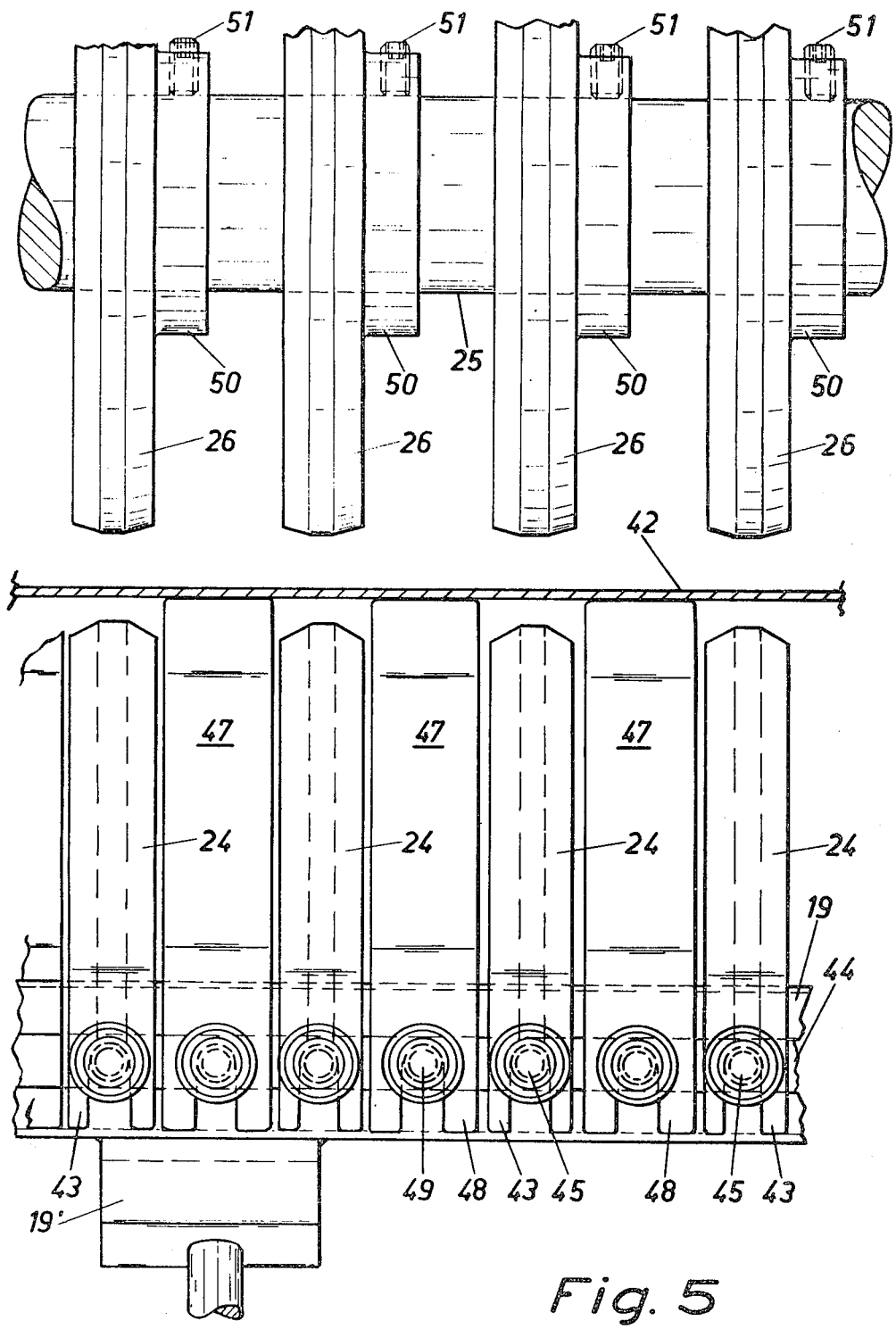
FIG. 5 illustrates the details of FIG. 4 in a view from above.

FIGS. 4 and 5 show the structure of the welding members and the press rings in closer detail. The welding members 24 have a fork-shaped attachment section 43 which is arranged to engage the beam 19. The latter is provided on its upper face with a lengthwise groove 44. The welding members are clamped to the beam by means of bolts 45 which are screwed into locking members 46 in the beam interior. This makes it possible to set the welding members in any arbitrary position along the beam.

Folding rulers 47 are positioned between the welding members 24. Like the welding members the folding rulers are provided with a fork-shaped attachment section 48 with the aid of which the rulers may be secured to the beam by means of bolts 49 and locking members 46 provided in the beam interior. As appears from FIG. 4, the pistons 21, 22 and 32, 33, are connected to their respective beam by means of attachments 19'. Each one of the press rings 26 provided on presser means 25 is equipped with a flange 50 in which a threaded hole is formed to receive a locking screw 51 therein. Consequently, the press rings 26 may be set in any arbitrary position along the presser means.

In the manufacture of a multi-tube filter a first part 52 of material web (see FIG. 2) is pulled manually across the table 3, while ensuring that the part has a length which is equal to the desired length of the filter tube. The table 3 is provided with crosswise bur fastener strips 53, 54 serving to secure and retain the first part 52 of the web positioned on top of the table. The pistons 32, 33 displace the rail 34 with the welding members 35 thereon obliquely downwards in the direction towards the tangential line between the table 3 and the press rings 37, whereby the folding rulers 47 bring along the material web 42 in their movement such that a fold is formed in the web between the table and the press rings. In FIG. 2, the machine is shown in a position immediately following this folding. The table is then moved in the direction of arrow A in FIG. 2, while at the same time the presser roller is driven at such a speed that the peripheral speed of the press rings coincide with the speed of the table. The material web will then be withdrawn from the supply roll at the same speed as the table, whereby a second part 55 of the material web is pressed against the first one at the rate of advancement. The part 52 of the web 42 withdrawn from the supply roll 14 and fed in underneath the press rings 37 is heated by the welding members 35, whereby the synthetic fibres in the material web are softened along lengthwise runs and when the two web parts 52, 55 are pressed together below the press rings 37 which are positioned opposite the welding members 35, the two parts will be interconnected by lengthwise welding seams.

Figure 3:
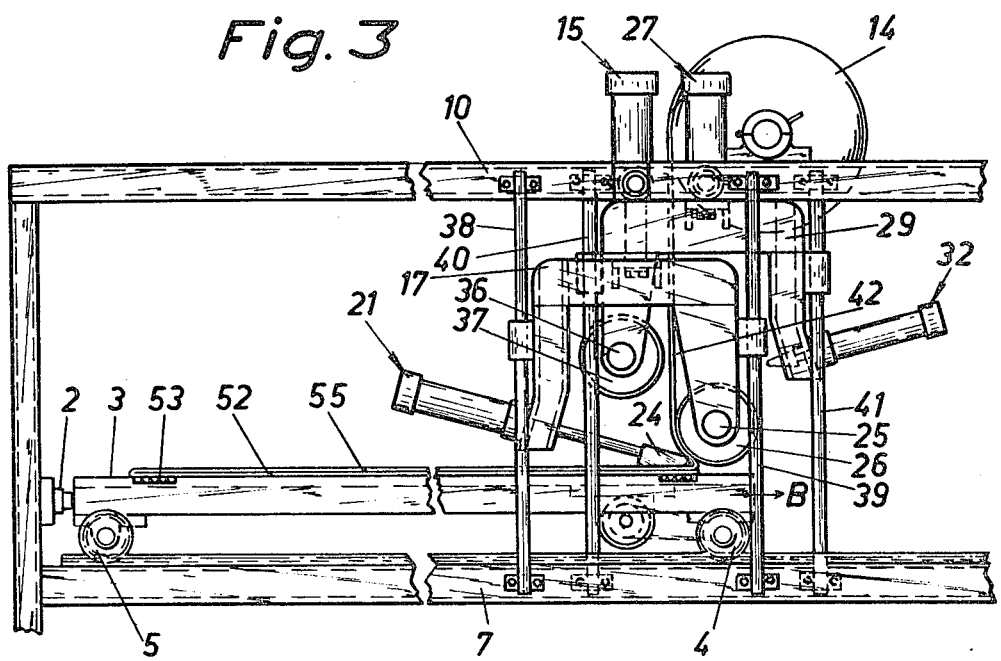
FIG. 3 illustrates the machine of FIG. 2 during a later stage of the manufacture of the filter.

Having been displaced in the direction of arrow A up to the second limit means 2, the table 3 remains in this position until the welding members 35 on rail 34 and the folding rulers 47 are moved out of their engagement with the material web 42 by pistons 32, 33, which return to their fully retracted position. In this position the welding members and the folding rulers are positioned laterally offset relative to the vertical path of movement of the presser means 25 secured in brackets 17, 18. The brackets 29, 30 and consequently also pressing roller 36 and rail 34 may be lifted by pistons 27, 28 from the table. The brackets 17 and 18 and therefore also pressing means 25 and rail 19 may at the same time be lowered by pistons 15, 16. When the brackets 17, 18 are in their lower position, the rail 23 together with the welding members 24 thereon and the folding rulers are displaced in a direction obliquely downwards against the contacting line between the press rings 26 and the doubled material web on the table, whereupon the folding rulers bring along the material web 42, folding the latter. FIG. 3 illustrates the machine immediately after this folding.

The table is then displaced in the direction of arrow B in FIG. 3 while at the same time presser means 25 is driven at such a speed that the peripheral speed of the press rings will agree with the speed of the table. As a result, the material web will be unreeled from the supply roll at the same speed as the table and a third part of the material web will be pressed against the second one at the rate of advancement. The part 55 of the web 42 unreeled from the supply roll is passed in underneath the press rings 26 and heated by the welding members 24 along lengthwise runs and when pressed together below the press rings 26 the two heated parts are welded together along lengthwise welding seams.

As appears from FIG. 1, the press rings 26 and their associated welding members 24 in alignment therewith are positioned half way between, i.e. staggered relative to, the press rings 37 and their associated welding members 35. The filter tubes formed by the welding together of the first two web parts 52, 55 thus are interconnected to the third material layer by means of lengthwise welding seams at the centre of the tubes during the application of the latter layer.

The third web part is then welded to the fourth part in the same manner as the first part was welded to the second one, i.e. with the welding seams between the parts in alignment with the welding seams between the first and the second parts 52, 55.

The multi-tube filter is produced successively in the manner described above until the desired number of connected rows of filter tubes is achieved.

When the web parts are welded together, it is not possible to extend the welding seam all the way up to the folding line but, as appears from FIG. 6, the welding seams 56 stop a short distance away from the folding line. Each row of filter tubes therefore must be provided at their corners with a welding seam 57 in order that the filter be sealed.

When the multi-tube filter produced in the manner indicated is distended in a direction at right angles to the lengthwise extension as well as to each row of filter tubes, all filter tubes of the filter package unit are extended in a bellow-like manner (FIG. 8) as a result of all tubes of one row being interconnected at their centres to the adjacent tubes of the neighbouring rows at the centres of those tubes by means of lengthwise welding seams.

Figure 7:
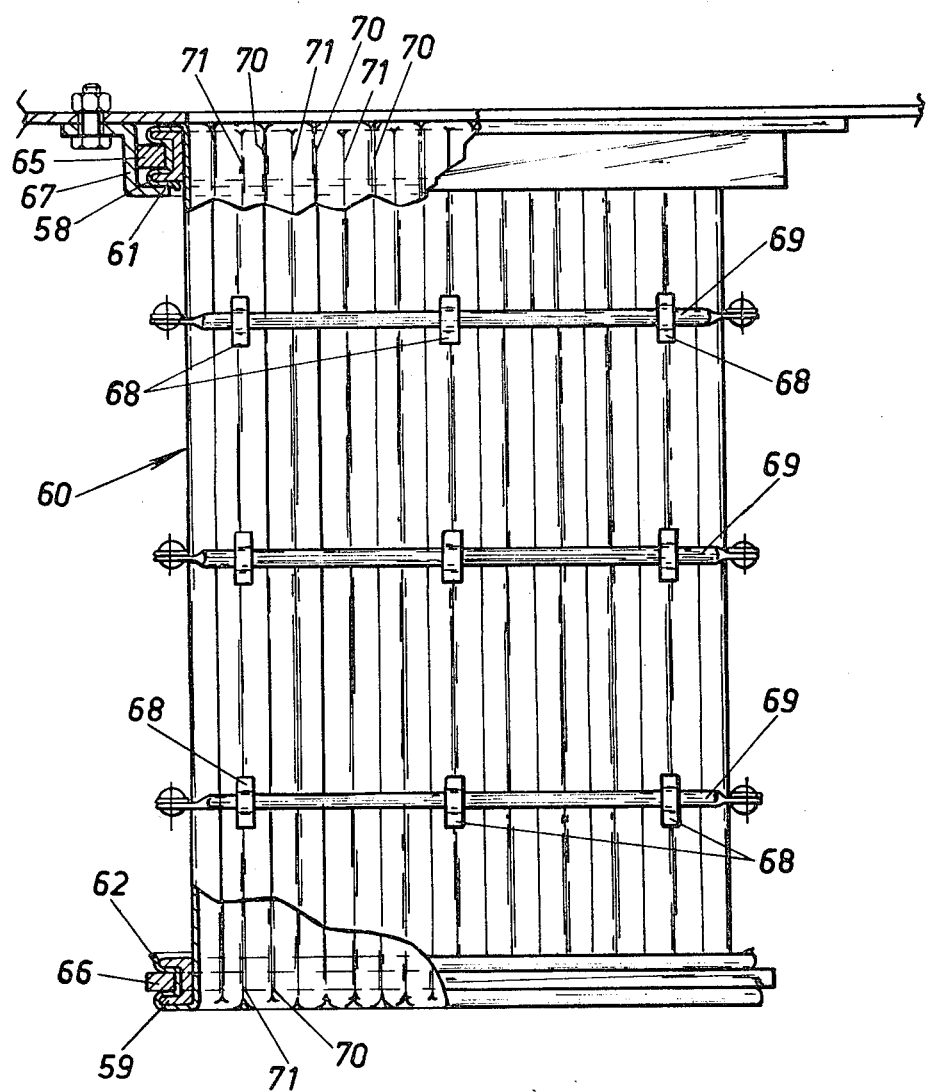
FIG. 7 shows a filter unit manufactured in the machine, the unit being distended to form a multi-tube filter.

FIG. 7 shows a filter 60 mounted in frames 58, 59 in distended position. In the manufacture of the filter package in the machine the web parts of the first and last rows are made somewhat longer than the rest. The mounting of the filter in the frames 58, 59 is effected with the aid of these prolonged parts two of which, designated 61, 62 are shown in the drawings, and also with the aid of an additional two parts at each end of the filter, which parts are preferably sewn onto the filter. The latter parts stitched to the filter are designated 63, 64 in FIG. 8. The filter is mounted in distended position in the frames in that said prolonged parts and the stitched-on parts are folded about the frame which is of U-shaped cross-sectional configuration, and are secured by sealing strips 65, 66 (see FIG. 7) which are pressed into the recess of the frame so as to clampingly secure the parts to the frame.

The filter unit mounted in the frames may, as appears from FIG. 7, be suspended in attachment beams 67 in a filter duct.

Equidistantly spaced over all faces of the filter 60 are attachment pockets 68. FIG. 7 shows three rows of attachment pockets of this kind. Into the attachment pockets are inserted from each side of the filter support rods or support pipes 69 which are connected to adjacent support pipes at the filter corners. The support pipes assist in keeping the filter in a fully distended condition, ensuring that the filter tubes remain open over their entire length and are not deflated by the gas pressure exerted on them from the outside.

The cross-sectional parts shown in FIG. 7 illustrate the appearance of the filter interior in the distended and mounted position thereof. The section is taken rectilinearly through the welding seams that interconnect the filter tubes of neighbouring rows. In the drawing figure, these welding seams are designated by numeral 70. The welding seams which delimit the individual filter tubes of each row are designated by 71. Each individual filter tube thus is delimited by two opposite welding seams 70 and two opposite welding seams 71. When a filter unit which after manufacture thereof in the machine forms a flat package is to be distended, one extends the filter in a direction at right angles to the rows of filter tubes. As a result, the two opposite welding seams 70 of each filter tube are moved away from one another while the other two opposite welding seams 71 approach one another. The filter tubes thus will have an essentially rectangular cross-sectional shape.

FIG. 8 illustrates in a partly broken view a filter in the distended position thereof as seen from one end of the filter. The filter as shown is mounted in a support pipe 69 but not yet attached in the frames. The appearance of the multi-tube filter as seen from one end thereof with the various rows of filter tubes appears from this figure. The figure also shows in the cross-sectional view of the corner the appearance of the filter tubes in distended position.

Figure 9:
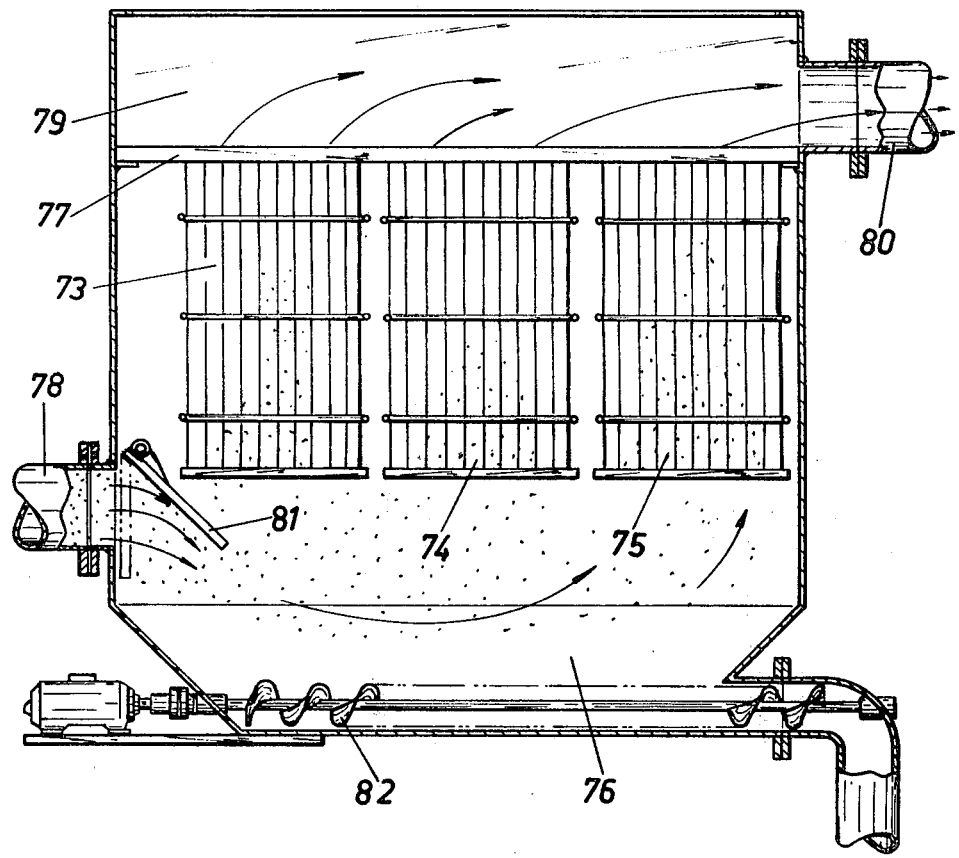
FIG. 9 illustrates the arrangement of several multi-tube filters in a large filtering apparatus.

FIG. 9 shows a cleaning apparatus 72 incorporating a plurality of "cassettes" or cartridges of multi-tube filter units 73, 74, 75 produced in accordance with the teachings of the invention. The filter units are suspended from the ceiling 77 of the filtering chamber 76 in the manner shown in FIG. 7. Fumes to be cleaned flow through the inlet conduit 78 into the filtering chamber 76 and via the multi-tube filters to a space 79 from which the cleaned gas is discharged into the surrounding atmosphere via the outlet conduit 80.

When the multi-tube filters are to be cleaned, the inlet opening 78 is closed by a baffle 81 and air is blown into the apparatus in reverse flow direction, i.e. through the inlet opening 80, through the filters and down into chamber 76, whereby the dirt and impurities collected in the filter tubes come loose. Air blown in through the inlet opening to clean the filters is evacuated through an opening (not shown) close to the bottom of chamber 76, where the impurities are collected, e.g. in an air-permeable bag (not shown). Heavier particles fall down to the bottom of the chamber 76 whence they are withdrawn from the apparatus by a screw worm pump 82.

The method and the machine for the manufacture of multi-tube filters in accordance with the invention are not limited to the example given above but several modifications are possible within the scope of the appended claims.

The presser means and the welding members associated therewith obviously need not be mounted on the very same bracket but it is equally possible to mount the presser means and the welding members associated therewith separately and arrange for operation thereof by separate pistons.

In accordance with the embodiment shown the presser means and the welding members are pressed against the material parts on the table by their own weight. However, the machine may be supplemented by resilient means serving to urge the pressing means against the material web and forcing the welding members to abut on the web.

In the machine described above the multi-tube filter is interconnected by welding. Obviously, it is possible to modify the machine in a manner permitting the filter to be glued together. It is likewise possible to stitch the filters together. In the latter case more extensive modification of the machine is required. For instance, upon stitching of one row support rails must be provided in the separate pockets at least in the row of filter tubes positioned immediately below.

What I claim is:

1. A machine for making multi-tube filter units with interconnected rows of filter tubes, comprising a table capable of displacement in opposite directions during folding of a continuous web of filter material upon itself to form a stack of parts of said material web, first presser means associated with first interconnecting members and means for activating them together during displacement of said table in one direction for pressing on said parts of said material web, while said first interconnecting members being positioned below the part being pressed by said first presser means for providing the interconnection of said parts along spaced first lines, second presser means associated with second interconnecting members and means for activating them together during displacement of said table in the opposite direction for pressing on said parts of material web, while said second interconnecting members being positioned below the part being pressed by said second presser means for providing the interconnection of said parts along spaced second lines, and means for controlling said displacement of said table.

2. A machine as claimed in claim 1, wherein said presser means are press rings arranged on a shaft.

3. A machine as claimed in claim 2, wherein said press rings and their associated interconnecting members may be set in arbitrary positions along the width of said web.

4. A machine as claimed in claim 2, wherein said press rings are peripheral beads formed on a roller.

5. A machine as claimed in claim 1, wherein said interconnecting members are welding members in the form of hot air nozzles.

6. A machine as claimed in claim 1, wherein said interconnecting members are welding members in the form of electrically heated welding jaws or shoes.

7. A machine as claimed in claim 1, wherein said interconnecting members are glueing members such as glue spreading nozzles.

8. A machine as claimed in claim 1, wherein said interconnecting members are stitching members in the form of sewing machine heads.

9. A machine as claimed in claim 2, comprising spring means arranged to press said press rings of said first and said second presser means against said web.

10. A machine as claimed in claim 1, comprising spring means arranged to bring said interconnecting members into abutment against said web.

11. A machine as claimed in claim 1, comprising a piston, said interconnecting members connected with said piston to be displaced together with said piston in the direction towards and away from their said associated press rings.

12. A machine as claimed in claim 1, comprising a number of pistons, said interconnecting members connected with said pistons to be displaced together with said pistons towards and away from their said associated press rings.

13. A machine as claimed in claim 2, comprising a number of folding rulers between said interconnecting members in alternate positions therewith, said folding rulers arranged to fold and guide said web of material unreeled from said roller in between said table and said press rings abutting against said table.

* * * * *